US009146682B2

(12) United States Patent
Gao et al.

(10) Patent No.: US 9,146,682 B2
(45) Date of Patent: Sep. 29, 2015

(54) METHOD AND APPARATUS FOR STORING DATA (71) Applicant: International Business Machines Corporation, Armonk, NY (US)

(72) Inventors: Meng Gao, Shanghai (CN); Yang Liu, Shanghai (CN); Mei Mei, Shanghai (CN); Jie Ping Wu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/488,429

(22) Filed: Sep. 17, 2014

(65) Prior Publication Data
US 2015/0095528 A1   Apr. 2, 2015

(30) Foreign Application Priority Data

Sep. 29, 2013   (CN) .......................... 2013 1 0454982

(51) Int. Cl.
*G06F 3/06* (2006.01)
(52) U.S. Cl.
CPC ............ *G06F 3/0611* (2013.01); *G06F 3/0631* (2013.01); *G06F 3/0646* (2013.01); *G06F 3/0683* (2013.01)
(58) Field of Classification Search
CPC combination set(s) only.
See application file for complete search history.

(56) References Cited

U.S. PATENT DOCUMENTS

| 8,315,995 | B1 | 11/2012 | Levy |
| 8,380,947 | B2 | 2/2013 | Chiu et al. |
| 2006/0218366 | A1* | 9/2006 | Fukuda et al. ................ 711/165 |
| 2009/0182957 | A1* | 7/2009 | Yashiro ......................... 711/156 |
| 2009/0287751 | A1* | 11/2009 | Hasegawa et al. ............ 707/205 |
| 2011/0010514 | A1 | 1/2011 | Benhase et al. |
| 2011/0202741 | A1* | 8/2011 | Tajima et al. ................. 711/165 |
| 2012/0290779 | A1 | 11/2012 | Eleftheriou et al. |
| 2013/0031298 | A1* | 1/2013 | Tan et al. ...................... 711/103 |
| 2013/0111129 | A1 | 5/2013 | Maki et al. |
| 2013/0166839 | A1 | 6/2013 | Burton et al. |
| 2013/0185256 | A1 | 7/2013 | Alatorre et al. |
| 2015/0081964 | A1* | 3/2015 | Kihara et al. ................. 711/114 |

OTHER PUBLICATIONS

Gao et al., "Method and Apparatus for Storing Data," Filed on Sep. 29, 2013, p. 1-25, CN Patent Application No. 201310454982.7.
Hitachi, "Hitachi Universal Storage Platform™ V and Hitachi Universal Storage Platform VM," Architecture Guide, Oct. 2008, p. 1-39, Hitachi Data Systems Corporation.
Quantum, "StorNext 4.0 Technical Product Brief," Product Brief, Jan. 2010, p. 1-11, Quantum Corporation.

* cited by examiner

*Primary Examiner* — Ilwoo Park
(74) *Attorney, Agent, or Firm* — David Zwick; Randall J. Bluestone (57) ABSTRACT

An allocation instruction is received that includes a target data operand and a storage medium operand indicating a storage medium for storing the target data. A data dependency is identified that specifies peripheral data on which the target data depends. In response to determining that the allocation instruction will cause the target data and the peripheral data to locate to different storage mediums having different data IO rates, the execution of the allocation instruction is prevented. In another embodiment, in response to determining that the allocation instruction allocates the target data from a first storage medium to a second storage medium having a faster data IO rate, the allocation instruction is modified to also allocate the peripheral data specified in the data dependency to the second storage medium.

18 Claims, 3 Drawing Sheets

METHOD AND APPARATUS FOR STORING DATA

BACKGROUND

The present invention relates to data storage technology, and more specifically, to a method and apparatus for data storage.

Data IO rate is one of the main performance indicators of storage devices. Modern storage devices are generally heterogeneous storage devices, i.e., containing storage devices having different storage mediums. The most common storage medium is Hard Disk Drive (HDD) based on magnetic disk technology and Solid State Disk (SSD) based on flash memory technology. Data IO rates that may be supported by HDDs are limited by the rates of mechanical operations, such as disk rotation and magnetic head movement. SSD has much higher data IO rates than data IO rates of HDD because mechanical operations such as disk rotation and magnetic head movement are avoided. On the other hand, SSD has a higher cost than HDD, and thus may be merely suitable for storing smaller amounts of data. A storage device may further include a storage controller for controlling data allocation among different storage mediums.

For such heterogeneous storage devices, traditional optimization methods for homogeneous storage devices are not applicable. A homogeneous storage device has the same storage media, while a heterogeneous storage device has different storage mediums with significant performance and cost differences. Thus, it may be necessary to allocate data with different properties to different storage mediums based on a comprehensive consideration of data properties, storage medium performance, and costs of the storage mediums, to achieve balance between performance and cost, thereby improving storage efficiency. As a fundamental principle, a small amount of data having a higher access frequency should be stored on an SSD, and a large amount of data having a lower access frequency should be stored on an HDD. Whether specific data should be stored on SSD or HDD may be determined by a system administrator based on experience. In addition, with variances in the data access frequency, data may be reallocated between HDD and SSD, that is, data having a higher access frequency may be reallocated from HDD to SSD, and data having a lower access frequency may be reallocated from SSD to HDD.

Taking the complexity of data stored in a storage device into consideration, simply allocating data based on the above fundamental principle may not improve storage efficiency effectively. Thus, a new method for allocating data among different storage mediums of a storage device is desired.

SUMMARY

Embodiments of the present invention disclose a method, computer program product, and system for storing data. An allocation instruction is received that includes a target data operand and a storage medium operand indicating a storage medium for storing the target data. A data dependency is identified that specifies peripheral data on which the target data depends. In response to determining that the allocation instruction will cause the target data and the peripheral data to locate to different storage mediums having different data IO rates, the execution of the allocation instruction is prevented.

In another embodiment, in response to determining that the allocation instruction allocates the target data from a first storage medium to a second storage medium having a faster data IO rate, the allocation instruction is modified to also allocate the peripheral data specified in the data dependency to the second storage medium.

BRIEF DESCRIPTION OF THE SEVERAL VIEWS OF THE DRAWINGS

Through more detailed description of some embodiments of the present disclosure in the accompanying drawings, the above and other objects, features, and advantages of the present disclosure will become more apparent, wherein the same reference numerals generally refer to the same component in the embodiments of the present disclosure.

DETAILED DESCRIPTION

Some exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the understanding of the present disclosure, and conveying the scope of the exemplary embodiments to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
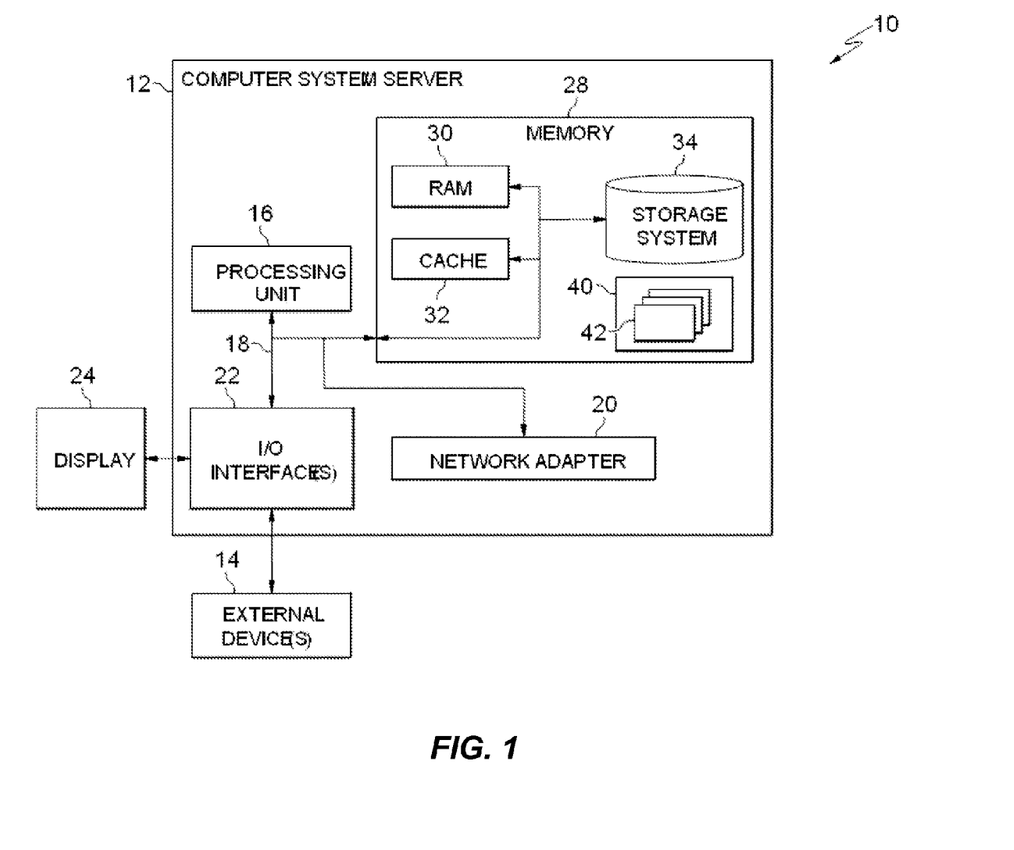
FIG. 1 shows an exemplary computer system/server in accordance with an embodiment of the present invention.

Referring now to FIG. 1, an exemplary computer system/server 12 which may be applicable to implement an embodiment of the present invention is shown. Computer system/server 12 is only illustrative and is not intended to suggest any limitation as to the scope of use or functionality of embodiments of the invention described herein.

As shown in FIG. 1, computer system/server 12 is in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that may be accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

When there are dependence relationships between data stored on a storage device, storage efficiency may not be effectively improved through simply allocating data having a higher access frequency to SSD. For example, assume that data block B is a flash copy of data block A, namely, before updating data block A, current values of data block A must be copied to data block B, and an instruction for updating data block A may only be executed after the completion of the copy operation. If data block A is read frequently, data block A may be allocated to SSD. However if data block A is not written frequently, data block B is neither read nor written frequently, and therefore may be allocated to HDD. Thus, when it is needed to write data to data block A, although data block A is located in SSD, because it is required to perform the writing operation on data block B, the actual writing speed may be not an expected writing speed result based on the data IO rate of the SSD, but is dependent on the data IO rate of the HDD.

This difference between the expected writing speed and the actual writing speed of data block A may cause a so-called contention issue. Particularly, because data block A is located on SSD, the storage controller expects that a first writing operation on data block A may be completed in a first shorter period of time according to the data IO rate of SSD, and a second writing operation on data block A may be started after the first period of time. However, in fact, the first writing operation on data block A may not be completed after the first period of time, and a conflict may arise if the second writing operation is performed on data block A at that point.

Data dependency may occur in other situations. For example, metadata needs to be identified and read before actual data updating of some applications. The metadata may be access control data, address mapping data, etc. Before writing a file, it must be confirmed whether a current user has permission to perform writing operations to this file. If the metadata with the user permission is stored on HDD, even if data of the file itself is stored on SSD, the actual writing speed of this file may be lower than an expected writing speed due to the reading of such metadata.

Figure 2:
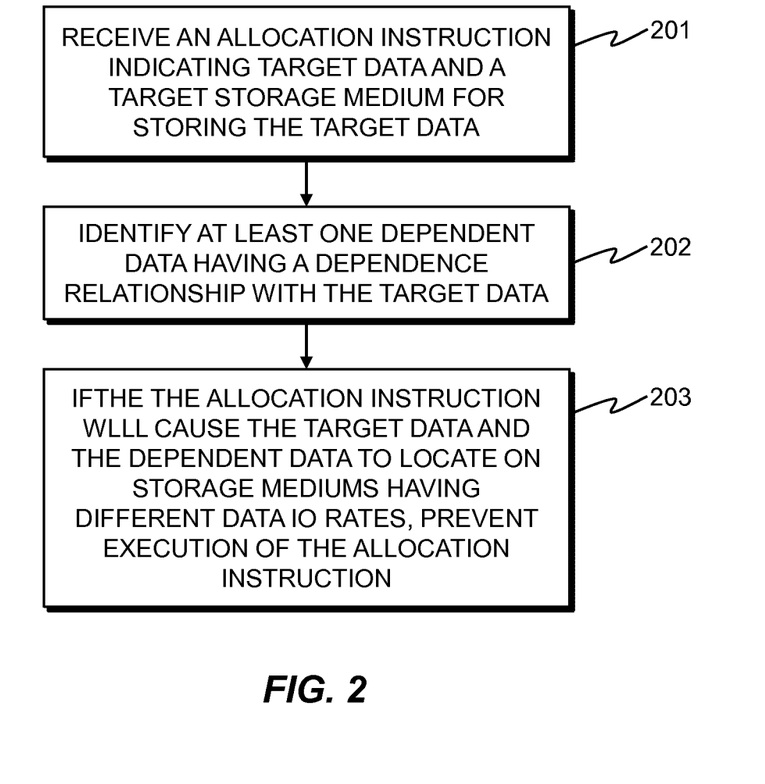
FIG. 2 is a flowchart of a method for storing data, in accordance with an embodiment of the present invention.

A method for storing data according to an embodiment of the invention will be described with reference to FIG. 2. In the following description, unless otherwise specified, a data block is equivalent to data stored in the data block.

At step 201, an allocation instruction may be read that indicates target data and a target storage medium for storing the target data.

In general, an allocation instruction includes at least two operands: a target data operand, and a target storage medium operand. If the allocation instruction is to store new data at a first storage location, the target data operand may contain the new data, and the target storage medium operand may contain the address of the first storage location. If the allocation instruction is to move or copy data that has been stored at a second storage location to a third storage location, the target data operand may contain the address of the second storage location, and the target storage medium operand may contain the address of the third storage location.

The allocation instruction may be a promotion allocation instruction for allocating target data to a high speed storage medium. Allocating the target data to a high speed storage medium such as SSD may be storing the target data to SSD initially. For example, installing an application on SSD through specifying an installation directory when the application is installed. Allocating target data to SSD may also be reallocating target data that is originally stored on HDD to SSD. For example, according to the above description, target data having a higher access frequency may be reallocated to SSD from HDD. The promotion allocation instruction may be from a storage optimization module on the storage device, or from an application server coupled to the storage device.

The allocation instruction may also be a demotion allocation instruction. The demotion allocation instruction may be used to allocate target data to a low speed storage medium. Allocating target data to a low speed storage medium such as HDD may be storing the target data to HDD initially, for example, installing an application on HDD through specifying an installation directory when the application is installed. Allocating the target data to HDD may be reallocating target data that is originally stored on SSD to HDD. For example, according to the above description, target data having a lower access frequency may be reallocated to HDD from SSD. The demotion allocation instruction may be from a storage optimization module on the storage device, or from an application server coupled to the storage device.

At step 202, at least one data dependency related to the target data is identified, wherein the at least one data dependency indicates data having a dependence relationship with the target data.

According to embodiments of the invention, each data dependency includes primary data and peripheral data. The primary data depends on the peripheral data. Those skilled in the art may appreciate that data stored in a data block may be used as primary data in a plurality of data dependencies. For example, assume that data block B is a flash copy of data block A, and access control data corresponding to data stored in data block A is stored in data block C. Before performing a writing operation on block A, it may be required to not only copy data stored in data block A to data block B, but also to read access control data from data block C. Accordingly, data in data block A depends on not only data in data block B, but also on data in data block C. In the data dependency between data stored in data block A and data stored in data block B, data stored in data block A is the primary data and data stored in data block B is the peripheral data. In the data dependency between data stored in data block A and data stored in data block C, data stored in data block A is the primary data and data stored in data block C is the peripheral data.

In the above example, each data dependency only includes one primary data and one peripheral data. In practice, each primary data may depend on a plurality of different peripheral data, and the data being depended on may further depend on other data. Those skilled in the art may appreciate that these complex scenarios may be resolved into a plurality of data dependencies that include only a single primary data and a single peripheral data as described above. Those skilled in the art may represent a dependence relationship in other forms, each of which however may be converted into a data dependency including only one primary data and one peripheral data as described above. Thus, in this application, descriptions of data dependencies will be of a single primary data and a single peripheral data.

The dependence relationship between the primary data and the peripheral data in a data dependency may be determined by the data itself. For example, the peripheral data may be a corresponding flash copy data of the primary data or the peripheral data may be metadata corresponding to the primary data. The dependence relationship may be specified by an application server as well. The dependence relationship may be determined through detecting specific instructions. For example, if an instruction for creating a flash copy between data block A and data block B is detected, it may indicate a data dependency including data block A and data block B should be created, wherein data block A is primary data, data block B is peripheral data. The specific instruction may be an instruction for explicitly creating a dependence relationship, i.e., indicating primary data and peripheral data explicitly. The dependence relationship may be identified through detecting a relationship between data access instructions. For example, if data block B is a flash copy of data block A, a writing instruction directed to data block A may necessarily invoke a writing instruction directed to data block B, indicating that a data dependency between data block A and data block B needs to be created.

In addition to indicating the primary data and the peripheral data, a data dependency may further include a condition required for dissolving the data dependency. According to an embodiment of the invention, the condition may be the occurrence of a specific event. For example, if an event of deleting a flash copy relationship occurs, a data dependency corresponding to the flash copy relationship should be dissolved. According to another embodiment of the invention, the condition may be a lifespan threshold of the data dependency.

At step 203, if the allocation instruction will cause the target data and the associated data to locate on storage mediums having different data TO rates, execution of the allocation instruction is prevented.

As described above, when there is a dependence relationship between data, simply allocating data having a high access frequency to a high speed storage medium or allocating data having a low access frequency to a low speed storage medium may not improve storage efficiency effectively. Thus, if the allocation instruction will cause the target data and the associated data to locate on storage mediums having different data TO rates, execution of the allocation instruction may be suspended. After that, different processing methods may be adopted for promotion and demotion allocation instructions respectively.

According to an embodiment of the invention, if the allocation instruction is a promotion allocation instruction, it may be modified to allocate associated data indicated by the data dependency to a high speed storage medium.

According to an embodiment of the invention, in a data dependency, data to be allocated to SSD is primary data. This may be because the access rate of primary data is limited by access rate of peripheral data, while access rate of peripheral data is not limited by access rate of primary data.

Assume that the allocation instruction read at step 201 is a promotion allocation instruction to allocate data block A having primary data stored thereon to SSD. After execution of the promotion allocation instruction, if data block B storing peripheral data is still located on HDD, access rate of data block A depends on the data IO rate of the HDD where data block B locates, instead of the data IO rate of the SSD where data block A locates. In this case, reallocating data block B on HDD to SSD may improve access rate of data block A from a level corresponding to the data IO rate of the HDD to a level corresponding to the data IO rate of the SSD.

In another example, assume that the allocation instruction read at step 201 is a promotion allocation instruction to allocate data block B having peripheral data stored thereon to SSD. This may be because data block B has a high enough access frequency or data block B is depended on by other data blocks. That is to say, the access to data block A is not a premise of the access to data block B. Thus, even if data block A having primary data stored thereon is located on the HDD due to its lower access frequency, access rate of data block B depends on the data IO rate of the SSD where data block B locates.

In practice, there may be a situation in which not all peripheral data depended on by the primary data may be allocated to the SSD. For example, the SSD has a free data capacity that is less than the amount of all of the peripheral data. In such a case, a prompt message may be given to indicate that executing the promotion allocation message may not improve access rate of the primary data.

According to embodiments of the invention, it is also possible to set different priorities for a plurality of data dependencies having the same target data as primary data. When it may be unable to allocate all peripheral data depended on by the primary data to SSD, which portions of peripheral data should be allocated to SSD may be determined according to their priorities. The priority may be determined according to a level of performance improvement resulting from allocating peripheral data to SSD. Herein, the performance improvement means improvement in access rate of primary data.

The priority may be determined according to the manner in which the primary data depends on the peripheral data. For example, assume that data block B is a flash copy of data block A, and access control data corresponding to data stored in data block A is stored in data block C. Also assume that a flash copying operation is necessary for each writing operation on data block A, and it is unnecessary to verify access permission for each writing operation on data block A. Thus, more performance improvement may be obtained through moving data block B from HDD to SSD than moving data block C from HDD to SSD. Thus, a data dependency composed of data block A and data block B may have a higher priority than a data dependency composed of data block A and data block C.

The priority may be determined according to the amount of the peripheral data. Moving a larger amount of peripheral data from HDD to SSD may bring about more performance improvement than moving a small amount of peripheral data from HDD to SSD. Thus, a data dependency corresponding to a larger data amount of peripheral data may have a higher priority than a data dependency corresponding to a smaller data amount of peripheral data.

HDD and SSD are described as the storage mediums in a storage device above as an example. Those skilled in the art will appreciate that HDD and SSD are merely examples of two storage mediums having different data TO rates, and there are many other storage mediums having different data TO rates. For example, a 7200 RPS HDD and a 10000 RPS HDD may be provided in a storage device. Because these two HDDs have different rotation speeds, they have different data TO rates as well. Embodiments of the invention are also applicable to such storage device.

For example, assume that there are three storage mediums having different access speeds, a 7500 RPS HDD, a 10000 RPS HDD, and an SSD, and assume that primary data and a plurality of peripheral data depended on by the primary data are all located on the 7500 RPS HDD initially. According to embodiments of the invention, if the primary data is allocated from the 7500 RPS HDD to the fastest SSD, when it is unable to allocate all of the peripheral data to the SSD, some of the peripheral data may be allocated to the SSD according to their priorities, and the remaining peripheral data may be allocated to the 10000 RPS HDD. Such allocation is also consistent with allocating data indicated by the data dependency to a high speed storage medium at step 203.

For an allocation instruction that is a demotion allocation instruction, if target data to be allocated to a low speed storage medium is peripheral data in a data dependency, and primary data in the data dependency is located on a high speed storage medium, after the demotion allocation instruction is prevented from executing, a message may be provided to indicate a reason for suspending the demotion allocation instruction.

As described above, the access speed of primary data may be limited by the access speed of peripheral data. Thus, if primary data in a data dependency is located on a SSD, and peripheral data in the data dependency is allocated to a HDD by the demotion allocation instruction, execution of the demotion allocation instruction may impact the access speed of the primary data. On the other hand, if the peripheral data in the data dependency is located on the SSD, and the primary data in the data dependency is allocated to the HDD by the demotion allocation instruction, because the access to the primary data is not a premise of the access to the peripheral data, execution of the demotion allocation instruction may not impact the access speed of the peripheral data.

According to another embodiment of the invention, after execution of the demotion allocation instruction is prevented, it is further detected whether the primary data in the data dependency is allocated to the low speed storage medium as well. If the primary data in the data dependency is allocated to the low speed storage medium as well, execution of the demotion allocation instruction is resumed.

Figure 3:
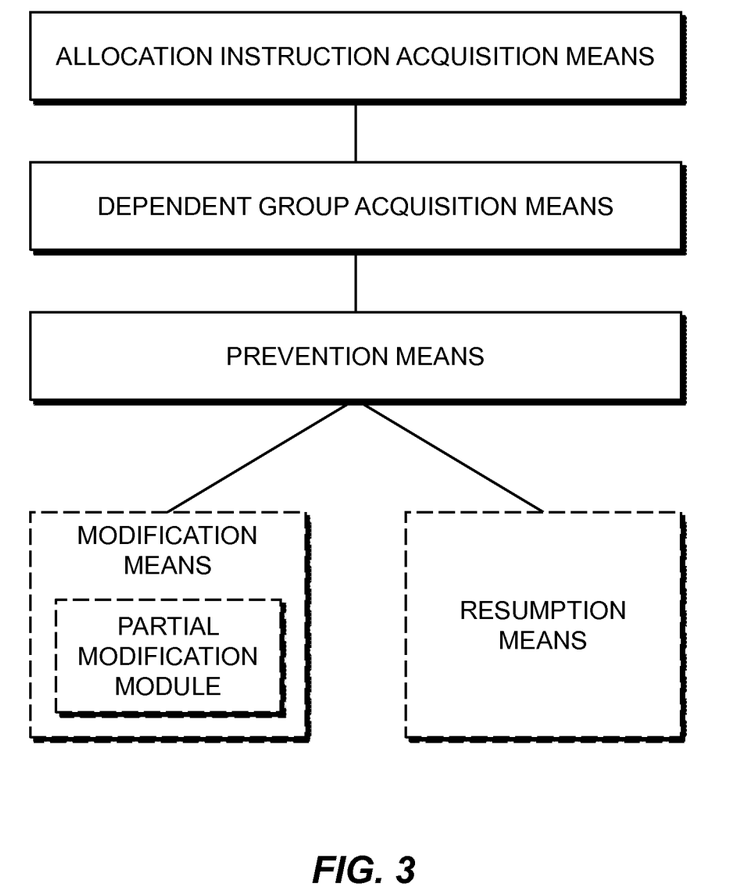
FIG. 3 is a block diagram of an apparatus for storing data, in accordance with an embodiment of the present invention.

FIG. 3 is a block diagram of an apparatus for storing data according to an embodiment of the invention. The apparatus for storing data may include an allocation instruction acquisition means configured to acquire an allocation instruction indicating target data and a target storage medium for storing the target data, a data dependency acquisition means configured to acquire at least one data dependency related to the target data, wherein the at least one data dependency each indicates associated data having a dependence relationship with the target data respectively, and wherein data used as primary data depends on data used as peripheral data in the data dependency, and a prevention means configured to prevent execution of the allocation instruction if the allocation instruction will cause the target data and the associated data indicated by the data dependency to locate on storage mediums having different data IO rates.

In certain embodiments, the allocation instruction is a promotion allocation instruction for allocating the target data to a high speed storage medium, and the apparatus further includes a modification means configured to modify the promotion allocation instruction so as to allocate associated data indicated by the data dependency to the high speed storage medium. In other embodiments, in the data dependency, the target data is used as primary data of the data dependency and the associated data is used as peripheral data of that data dependency.

In other embodiments, the data dependency acquisition means is configured to acquire a plurality of data dependencies, the plurality of data dependencies have the same target data as the primary data and the plurality of data dependencies have corresponding priority information respectively. Here, the modification means further includes a partial modification module, configured to, when it is unable to allocate all of the peripheral data on which the primary data depends to the high speed storage medium, modify the promotion allocation instruction so as to allocate the peripheral data indicated by some of the plurality of data dependencies with higher priorities to the high speed storage medium.

In certain embodiments, the high speed storage medium includes a first high speed storage medium and a second high speed storage medium, data IO rate of the first high speed storage medium being higher than the data IO rate of the second high speed storage medium, and wherein the promotion allocation instruction is used to allocate the target data to the first high speed storage medium. The partial modification module includes a module configured to modify the promotion allocation instruction so as to allocate some of the peripheral data with higher priority to the first high speed storage medium, and allocate the remaining peripheral data with lower priority to the second high speed storage medium. In various embodiments, the priority is determined according to a significant level of performance improvement resulted from allocating the peripheral data to the high speed storage medium, and the performance improvement means improvement in access speed of the primary data.

In some embodiments, the allocation instruction is a demotion allocation instruction for allocating the target data to a low speed storage medium, and the prevention means includes a module configured to, if the target data to be allocated to the low speed storage medium is the peripheral data of the data dependency and the primary data of the data dependency is located on the high speed storage medium, prevent execution of the demotion allocation instruction.

The apparatus may further include a resumption means, configured to, if it is detected that the primary data of the data dependency is allocated to the low speed storage medium as well, resume execution of the demotion allocation instruction. The data dependency may further indicate a condition for dissolving the data dependency.

The apparatus according to an embodiment of the invention may be typically implemented as a computer program running on the exemplary computer system shown in FIG. 1. Although a hardware structure of a general computer system is shown in FIG. 1, the computer program when running on this computer system to realize solutions of the embodiment of the invention may turn the computer system/server from a general computer system/server into an apparatus embodying the invention.

In addition, although generally the apparatus according to embodiments of the invention is realized by a general computer system, various means or modules constructing the system may be implemented in essence by discrete hardware elements. This may be because the general computer, when running the computer program, always implements the various means or modules in a time division manner or through sharing processor cores. Taking a time-division implementation as an example, at a particular time, the general computer system may be used as hardware dedicated to realizing particular means or a module; at different times, it may be used as hardware dedicated to realizing different means or modules. Thus, the apparatus according to the embodiment of the invention may be a combination of a series of means or modules in hardware, and thus is by no means a framework of functional modules. On the other hand, the apparatus according to the embodiment of the invention may be conceived as physical apparatus for implementing the solution of the embodiment according to the invention in hardware.

The above solution may be also implemented in software by a plurality of discrete modules, each module having storage and computing resources provided separately, for example, each module implemented by a small scale special computing chip, such as a single-chip microcomputer. According to an embodiment of the invention, in general, these modules operate according to a temporal order, and thus may be implemented on a general computing system in a time-division manner.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for storing data, the method comprising:
receiving an allocation instruction that includes a target data operand and a storage medium operand indicating a storage medium for storing the target data;
identifying a data dependency that specifies peripheral data on which the target data depends; and
in response to determining that the allocation instruction will cause the target data and the peripheral data to locate to different storage mediums having different data IO rates, preventing execution of the allocation instruction.

2. The method according to claim 1, further comprising:
in response to determining that the allocation instruction allocates the target data from a first storage medium to a second storage medium having a faster data IO rate, modifying the allocation instruction to also allocate the peripheral data specified in the data dependency to the second storage medium.

3. The method according to claim 1, further comprising:
identifying a plurality of data dependencies that specify peripheral data on which the target data depends, and wherein each of the data dependencies has a respective data dependency priority; and
in response to determining that the allocation instruction allocates the target data from a first storage medium to a second storage medium having a faster data TO rate and that not all of the peripheral data can be allocated to the second storage medium, modifying the promotion allocation instruction to also allocate one or more of the peripheral data identified in the data dependencies to the second storage medium, based on the respective data dependency priorities.

4. The method according to claim 1, further comprising:
identifying a plurality of data dependencies that specify peripheral data on which the target data depends, and wherein each of the data dependencies has a respective data dependency priority; and
in response to determining that the allocation instruction allocates the target data from a first storage medium to a second storage medium having a faster data TO rate and that not all of the peripheral data can be allocated to the second storage medium, modifying the promotion allocation instruction to also allocate one or more of the peripheral data identified in the data dependencies to one or more storage mediums with data TO rates that are at least faster than the storage mediums from which the peripheral data would be allocated, based on the respective data dependency priorities.

5. The method according to claim 3, wherein the data dependency priorities are determined according to a degree of improvement in access speed of the primary data resulting from allocating the peripheral data to the second storage medium.

6. The method according to claim 1, wherein the data dependency further identifies a condition for dissolving the data dependency.

7. A computer program product for storing data, the computer program product comprising:
one or more non-transitory computer readable storage media and program instructions stored on the one or more non-transitory computer-readable storage media, the program instructions comprising:
program instructions to receive an allocation instruction that includes a target data operand and a storage medium operand indicating a storage medium for storing the target data;
program instructions to identify a data dependency that specifies peripheral data on which the target data depends; and
program instructions, in response to determining that the allocation instruction will cause the target data and the peripheral data to locate to different storage mediums having different data TO rates, to prevent execution of the allocation instruction.

8. The computer program product according to claim 7, further comprising:
program instructions, in response to determining that the allocation instruction allocates the target data from a first storage medium to a second storage medium having a faster data TO rate, to modify the allocation instruction to also allocate the peripheral data specified in the data dependency to the second storage medium.

9. The computer program product according to claim 7, further comprising:
program instructions to identify a plurality of data dependencies that specify peripheral data on which the target data depends, and wherein each of the data dependencies has a respective data dependency priority; and
program instructions, in response to determining that the allocation instruction allocates the target data from a first storage medium to a second storage medium having a faster data TO rate and that not all of the peripheral data can be allocated to the second storage medium, to modify the promotion allocation instruction to also allocate one or more of the peripheral data identified in the data dependencies to the second storage medium, based on the respective data dependency priorities.

10. The computer program product according to claim 7, further comprising:
program instructions to identify a plurality of data dependencies that specify peripheral data on which the target data depends, and wherein each of the data dependencies has a respective data dependency priority; and
program instructions, in response to determining that the allocation instruction allocates the target data from a first storage medium to a second storage medium having a faster data TO rate and that not all of the peripheral data can be allocated to the second storage medium, to modify the promotion allocation instruction to also allocate one or more of the peripheral data identified in the data dependencies to one or more storage mediums with data TO rates that are at least faster than the storage mediums from which the peripheral data would be allocated, based on the respective data dependency priorities.

11. The computer program product according to claim 9, wherein the data dependency priorities are determined according to a degree of improvement in access speed of the primary data resulting from allocating the peripheral data to the second storage medium.

12. The computer program product according to claim 7, wherein the data dependency further identifies a condition for dissolving the data dependency.

13. A computer program system for storing data, the computer program system comprising:
    one or more computer processors, one or more computer readable storage media, and program instructions stored on one or more of the computer-readable storage media for execution by at least one of the one or more processors, the program instructions comprising:
    program instructions to receive an allocation instruction that includes a target data operand and a storage medium operand indicating a storage medium for storing the target data;
    program instructions to identify a data dependency that specifies peripheral data on which the target data depends; and
    program instructions, in response to determining that the allocation instruction will cause the target data and the peripheral data to locate to different storage mediums having different data IO rates, to prevent execution of the allocation instruction.

14. The computer system according to claim 13, further comprising:
    program instructions, in response to determining that the allocation instruction allocates the target data from a first storage medium to a second storage medium having a faster data TO rate, to modify the allocation instruction to also allocate the peripheral data specified in the data dependency to the second storage medium.

15. The computer system according to claim 13, further comprising:
    program instructions to identify a plurality of data dependencies that specify peripheral data on which the target data depends, and wherein each of the data dependencies has a respective data dependency priority; and
    program instructions, in response to determining that the allocation instruction allocates the target data from a first storage medium to a second storage medium having a faster data TO rate and that not all of the peripheral data can be allocated to the second storage medium, to modify the promotion allocation instruction to also allocate one or more of the peripheral data identified in the data dependencies to the second storage medium, based on the respective data dependency priorities.

16. The computer system according to claim 13, further comprising:
    program instructions to identify a plurality of data dependencies that specify peripheral data on which the target data depends, and wherein each of the data dependencies has a respective data dependency priority; and
    program instructions, in response to determining that the allocation instruction allocates the target data from a first storage medium to a second storage medium having a faster data TO rate and that not all of the peripheral data can be allocated to the second storage medium, to modify the promotion allocation instruction to also allocate one or more of the peripheral data identified in the data dependencies to one or more storage mediums with data TO rates that are at least faster than the storage mediums from which the peripheral data would be allocated, based on the respective data dependency priorities.

17. The computer system according to claim 15, wherein the data dependency priorities are determined according to a degree of improvement in access speed of the primary data resulting from allocating the peripheral data to the second storage medium.

18. The computer system according to claim 13, wherein the data dependency further identifies a condition for dissolving the data dependency.

* * * * *